US012583752B2

(12) United States Patent
Adler et al.

(10) Patent No.: US 12,583,752 B2
(45) Date of Patent: Mar. 24, 2026

(54) METHOD FOR SEPARATING IMPURITIES FROM SILICON CARBIDE, AND TEMPERATURE-TREATED AND PURIFIED SILICON CARBIDE POWDER

(71) Applicants: FRAUNHOFER-GESELLSCHAFT ZUR FÖRDERUNG DER ANGEWANDTEN FORSCHUNG E.V., Munich (DE); ESK-SIC GmbH, Frechen (DE)

(72) Inventors: Jörg Adler, Meißen (DE); Heike Heymer, Dresden (DE); Matthias Hausmann, Frechen (DE); Wenzel Klietz, Frechen (DE); Jan Räthel, Dresden (DE); Josef Garbes, Frechen (DE)

(73) Assignees: FRAUNHOFER-GESELLSCHAFT ZUR FÖRDERUNG DER ANGEWANDTEN FORSCHUNG E.V., Munich (DE); ESK-SIC GmbH, Frechen (DE)

( * ) Notice: Subject to any disclaimer, the term of this patent is extended or adjusted under 35 U.S.C. 154(b) by 858 days.

(21) Appl. No.: 17/795,362

(22) PCT Filed: Jan. 29, 2021

(86) PCT No.: PCT/EP2021/052173
§ 371 (c)(1),
(2) Date: Jul. 26, 2022

(87) PCT Pub. No.: WO2021/152134
PCT Pub. Date: Aug. 5, 2021

(65) Prior Publication Data
US 2023/0073241 A1      Mar. 9, 2023

(30) Foreign Application Priority Data
Jan. 31, 2020    (DE) ..................... 10 2020 102 512.2

(51) Int. Cl.
*C01B 32/956* (2017.01)

(52) U.S. Cl.
CPC ........ *C01B 32/956* (2017.08); *C01P 2004/61* (2013.01); *C01P 2004/62* (2013.01); *C01P 2006/80* (2013.01)

(58) Field of Classification Search
CPC .............. C01B 32/956; C01P 2004/61; C01P 2004/62; C01P 2006/80; C01P 2006/10; C01P 2006/11; C04B 35/62204; C04B 35/6268; C04B 35/62842; C04B 35/62892; C04B 35/62675; C04B 2235/3826; C04B 2235/5427; C04B 2235/5436; C04B 2235/5445; C04B 2235/72; C04B 2235/721; C04B 2235/728; C04B 35/565
See application file for complete search history.

(56) References Cited

U.S. PATENT DOCUMENTS

| | | | |
|---|---|---|---|
| 4,700,898 A | 10/1987 | Tremblay | |
| 5,179,049 A | 1/1993 | Numata et al. | |
| 6,627,169 B1 | 9/2003 | Itoh et al. | |
| 7,927,385 B2 * | 4/2011 | Skelton ................... | C30B 28/06 423/349 |

FOREIGN PATENT DOCUMENTS

| | | | | |
|---|---|---|---|---|
| CN | 103693646 A | * | 4/2014 | |
| DE | 76629 | | 9/1894 | |
| DE | 85197 | | 1/1896 | |
| DE | 10 2013 218 450 | | 6/2014 | |
| WO | 2004/098848 | | 11/2004 | |
| WO | WO-2015036371 A1 | * | 3/2015 | ........... C01B 32/984 |

OTHER PUBLICATIONS

Feng et al., "Iron removal from ultra-fine silicon carbide powders with ultrasound-assisted and its kinetics" Materials Chemistry and Physics 247, Feb. 2020, 1-8 (Year: 2020).*
Li et al., "Recovery of silicon carbide from waste silicon slurry by using flotation" Energy Procedia 136, Oct. 2017, 53-59 (Year: 2017).*
Liu et al., "Removal of Fe, B and P impurities by enhanced separation technique from silicon-rich powder of the multi-wire sawing slurry" Chemical Engineering Journal 299, Apr. 2016, 276-281 (Year: 2016).*
Silicon Carbide & More, #24, p. 3, Jul. 2008.
Int'l Search Report (Form PCT/ISA/210) conducted in Int'l Appln. No. PCT/EP2021/052173 (Mar. 23, 2021).
Int'l Written Opinion (Form PCT/ISA/237) conducted in Int'l Appln. No. PCT/EP2021/052173 (Mar. 23, 2021).

* cited by examiner

*Primary Examiner* — Anthony J Zimmer
*Assistant Examiner* — Abdul-Rahman Yusuf Waleed Smari
(74) *Attorney, Agent, or Firm* — GREENBLUM & BERNSTEIN, P.L.C.

(57) ABSTRACT

A method for separating impurities from silicon carbide, applicable to SiC powders from grinding sludges and to temperature-treated and purified silicon carbide powder. The method removes different impurities. Pulverulent SiC waste products having a SiC mass percentage of at least 50% and an average grain size d50 of 0.5 to 1000 µm, and that have been temperature-treated and cooled, are mechanically treated and physically separated. The physically separated SiC powder is divided into two fractions, one of which contains a mass of impurities greater than that of the other fraction by at least a factor of two.

24 Claims, No Drawings

METHOD FOR SEPARATING IMPURITIES FROM SILICON CARBIDE, AND TEMPERATURE-TREATED AND PURIFIED SILICON CARBIDE POWDER

The invention pertains to the field of technical ceramics and relates to a method for separating impurities from silicon carbide, which can be used, for example, on SiC powders of grinding sludges or on production-related silicon carbide waste or on so-called SiC sinter scrap, as well as a temperature-treated and purified silicon carbide powder.

Silicon carbide (SiC) is a synthetic industrial mineral that is used in many industrial sectors due to its outstanding properties (hardness, high temperature properties, chemical resistance). Of particular importance is its use in the form of special, highly pure, and finely fractionated fine powder grains (0.5 to approx. 250 µm) in microelectronics/photovoltaics (wafer saws), in ceramics production, for the production of ballistic protective ceramics for military technology, in automotive and environmental technology (diesel particle filters), and as an abrasive material for high-quality surface treatment throughout the field of mechanical engineering.

SiC powder grains are produced from especially raw SiC by grinding, purification, and fractionating. This results in high and constant amounts of low-grade, poorly usable SiC.

An increase in the demand for grains therefore always requires an increase in raw SiC production. In this respect, an increase in raw capacity is not lucrative for the producers, which leads to structural scarcity and price inelasticity.

The raw SiC production via the electrosynthesis process which has been used for approximately 120 years, the so-called Acheson process (DE 76629 A, DE 85197 A), is linked to the electricity and oil price (raw material: petroleum coke) and the environmental costs (due to high dust, $CO/CO_2$ and $SO_2$ emissions). Despite many attempts, alternative production methods have not been successful, mostly for economic reasons, and will not be available in the foreseeable future.

Although SiC is a mass raw material available worldwide, bottlenecks and price increases for the strategically important high-quality grains (HQ) have been seen for some years. In 2008, the deficit of HQ SiC raw material in Europe was estimated to be 40-60,000 t (Silicon Carbide & More #24, 2008, pg. 3). However, an even greater problem with the special grains is that high-tech applications require large quantities of individual grain size bands. Both lead to price surcharges and supply bottlenecks for these HQ special grains due to the price inelasticity conditions mentioned above.

SiC powders in abrasive applications are subject to wear in terms of cutting performance and grain size. A majority of the SiC is lost through dissipative processes. In many cases where SiC-containing waste products can be detected, the material separation is technically extremely difficult and preparation is not worthwhile economically.

Overall, there is a large amount of very differently impurified SiC powders. Depending on their origin, the impurities are of very different types and consist of organic and inorganic non-metallic and inorganic metallic impurities. Organic impurities include organic polymer residues (mostly hydrocarbon compounds) such as liquid oils, polyethylene glycol (PEG), solvents, lubricants, as well as solid polymers such as plastic debris.

The inorganic, non-metallic impurities include primarily free carbon and silicon oxides (mainly $SiO_2$) and Ca—Al—Si—O compounds.

Metallic impurities include iron and iron alloys, boron, vanadium, aluminum, titanium, copper, manganese, tungsten, chromium, nickel, and their compounds.

Furthermore, so-called free silicon ($Si_{free}$) can be contained, which is understood to mean metallic or alloyed silicon that is not bound in SiC or $SiO_2$.

SiC waste occurs during the production of SiC, for example in the Acheson process, or as fragments of SiC molded parts, which cannot then be processed industrially without further preparation steps.

The impurities are differentiated using known analysis methods, for example $C_{free}$, $Si_{free}$, $SiO_2$ and iron according to DIN EN ISO 9286, DIN EN ISO 21068 Part 1-3, and FEPA Standard 45-1:2011. Spectroscopic methods are also used in order to analyze the impurities, including DIN EN 15991.

A large number of methods for separating the impurities and thus for purification, i.e. increasing the concentration of the SiC portion of impurified SiC, are already known. These can be divided into physical and chemical methods.

Physical methods take advantage of different densities, particle sizes, and other physical properties, such as magnetic properties or wetting behavior, of some impurities.

For example, magnetic iron impurities are removed by magnetic separation. Impurities having different particle sizes and densities are separated by cyclone and hydrocyclone methods, impurities having different densities and wetting behavior through flotation methods.

Chemical methods substantially use the solubility of various impurities in chemicals such as solvents, acids, or alkalis. Because SiC is very stable in such chemicals, even very aggressive chemicals such as hydrofluoric acid can be used in order to dissolve the impurities.

Thermal methods can also be used in order to remove impurities, for example the oxidation of free carbon at temperatures of 400-800° C. in air.

It is also known that NaCl is sometimes added during the SiC synthesis, whereby undesirable impurities react with the chlorine at high temperatures in order to form volatile chlorides and are thus removed from the SiC. However, post-treatment of impurified powders using this method is not known, because it is very complex and the chlorine gas has an aggressive effect on the system technology and is not environmentally friendly.

A disadvantage of the known methods is the high cost of removing the impurities from the SiC, because the specific impurities must be removed using a method that is specific for this purpose. In order to achieve a high concentration of SiC that is as pure as possible, a plurality of methods must always be combined.

The problem of the present invention is to provide a method for separating impurities from silicon carbide, with which various impurities can be removed with a simple and economical method substantially completely or to such an extent that the purified silicon carbide powder can be reused industrially, and a temperature-treated silicon carbide powder that can be easily purified in a simple and cost-effective method, and purified silicon carbide powder that can be industrially resupplied, in particular for high-tech applications.

The problem is achieved by the invention specified in the claims. Advantageous configurations are the subject-matter of the subclaims, wherein the invention also includes combinations of the individual claims in the sense of an "AND" conjunction, as long as they are not mutually exclusive.

In the method according to the invention for separating impurities from silicon carbide, powdery SiC waste products that contain at least 50% by mass SiC and an average grain size $d_{50}$ between 0.5 and 1000 μm, measured by laser diffraction, and a minimum content of 0.1% by mass iron and 0.1% by mass metallic silicon are subjected to a temperature treatment under a vacuum or in a non-oxidizing atmosphere at temperatures of 1400-2600° C. and cooled, and are then mechanically treated and physically separated, and subsequently a division of the physically separated SiC powder into two fractions is performed, of which the mass of impurities in one fraction is at least twice as high as in the other fraction.

Advantageously, the mass of impurities in one fraction is at least 10 times higher, advantageously at least 20 times higher, than in the other fraction.

Furthermore advantageously, the powdery SiC waste products have at least 75% by mass SiC, advantageously 80% by mass SiC, more advantageously 85% by mass SiC, more advantageously 90% by mass SiC.

Likewise advantageously, powdery SiC waste products having at least 50% by mass SiC and an average particle size $d_{50}$) between 0.5 and 500 μm, measured by laser diffraction, are advantageously used.

Also advantageously, powdery SiC waste products having at least 50% by mass SiC and an average particle size $d_{50}$ between >500 and 1000 μm, measured by laser diffraction, are advantageously used.

It is advantageous when powdery SiC waste products having at least 50% by mass SiC and an average particle size $d_{50}$ between >500 and 1000 μm, measured by laser diffraction, are subjected to a temperature treatment at temperatures of 1400 to <2000° C.

It is likewise advantageous when powdery SiC waste products having at least 50% by mass SiC and an average particle size $d_{50}$ between 0.5 and 1000 μm, measured by laser diffraction, and a content of 0.5 to 5.0% by mass iron and 0.5 to 5.0% mass metallic silicon are used.

It is likewise advantageous when the temperature treatment of the SiC waste products is carried out at temperatures of 1400-2000° C.

It is also advantageous when the temperature treatment of the SiC waste products is carried out at temperatures of 2000-2600° C.

It is also advantageous when the temperature treatment is performed under a vacuum or a non-oxidizing atmosphere during the heating phase in the temperature range between 1200° C. and <1400° C. and from 1400° C. to 1800° C. with heating rates of less than or equal to 8 K/min.

It is furthermore advantageous when the temperature treatment is performed under a vacuum or a non-oxidizing atmosphere during the heating phase over 1800° C. with heating rates of less than or equal to 5 K/min.

It is likewise advantageous when the temperature treatment is performed under a vacuum or a non-oxidizing atmosphere with holding times at the maximum temperature of 10 min to 300 min.

It is also advantageous when the temperature treatment is performed under a non-oxidizing atmosphere with an amount of non-oxidizing gases of 0.5 to 30 l/h.

Advantageously, the temperature treatment is performed under a vacuum or a non-oxidizing atmosphere while dissipating gaseous reaction products.

Also advantageously, the cooling of the powdery SiC is performed at a cooling rate of 0.1 to 100 K/min.

Furthermore advantageously, the cooling of the powdery SiC is performed in a temperature range between 1200° C. and 800° C. at a cooling rate of 0.5 to 10 K/min.

It is furthermore advantageous when the mechanical treatment of the recycled powdery SiC is implemented by applying a mechanical impulse, advantageously by mixing, grinding, even more advantageously by autogenous grinding, or by using eddy currents and/or ultrasound.

It is also advantageous when the mechanical treatment is carried out with an energy input between 0.1 and 5 MJ/kg.

It is furthermore advantageous when the physical separation of the recycled powdery SiC is carried out according to the particle size, the particle shape, the density, and/or the physical and/or chemical surface properties of the particles.

It is likewise advantageous when the separation according to the particle size and/or particle shape is carried out by sieving, sifting, and/or cyclone methods.

It is also advantageous when the separation is carried out by the effect of mass forces with regard to the particle density by means of flotation, sedimentation, sifting, centrifugation, and/or cyclone methods, or when the separation is carried out according to the density of the particles through flotation and/or cyclone methods.

It is also advantageous when the separation is realized in a fraction containing at least 95% by mass, advantageously at least 98% by mass, even more advantageously at least 99% by mass silicon carbide.

It is also advantageous when substantially metallic impurities are separated as the impurities.

It is also advantageous when, in order to remove impurities in the form of Si and/or C, carbon, advantageously soot, graphite, and/or coke powder, and/or silicon and/or silicon dioxide ($SiO_2$), is added during the temperature treatment in order to achieve a composition that is as stoichiometric as possible.

The silicon carbide powder that is temperature-treated according to the invention contains SiC powder particles and substantially metallic impurities in the form of metallic mixed phases and has metallic impurities on the planar and/or convex surfaces of the silicon carbide powder particles, which are disposed in an island-like configuration or in the interstices between silicon carbide powder particles and are permanently bonded to one or more silicon carbide powder particles, wherein the impurities have a wetting angle between 10° C. and 90° C.

Furthermore, the purified silicon carbide powder according to the invention has at least 98% by mass SiC and a maximum of 2% by mass substantially metallic impurities, wherein the impurities are disposed substantially on the surface of the silicon carbide powder particles.

Advantageously, the purified silicon carbide powder has at least 99% by mass SiC.

Likewise advantageously, in the case of the purified SiC powder, the impurities are present in the form of island-like melts of metallic mixed phases on the surface of the silicon carbide powder particles, which are permanently bonded to the surface of the particles after a mechanical treatment.

Furthermore advantageously, metallic impurities are disposed on the surface in primary particles of silicon carbide and, in secondary particles of silicon carbide, on the surface and/or in the interstices of the particles.

Also advantageously, the impurities are disposed on the surface of the silicon carbide powder particles substantially on the convexly shaped parts of the surface of silicon carbide powder particles.

With the solution according to the invention, it is possible for the first time to remove various impurities from silicon carbide with a simple and economical method substantially completely or to such an extent that the purified silicon carbide powder can be reused industrially. It is also possible for the first time to provide temperature-treated SiC powder, which can be easily purified in a simple and cost-effective method, as well as purified silicon carbide powder that can be reused industrially, in particular for high-tech applications.

This is achieved by a method for separating impurities from silicon carbide, in which powdery SiC waste products that contain at least 50% by mass SiC and an average grain size $d_{50}$ between 0.5 and 1000 μm, measured by laser diffraction, and a minimum content of 0.1% by mass iron and 0.1% by mass metallic silicon are subjected to a temperature treatment under a vacuum or in a non-oxidizing atmosphere at temperatures of 1400-2600° C. and cooled, and are then mechanically treated and physically separated, and subsequently a division of the physically separated SiC powder into two fractions is performed, of which the mass of impurities in one fraction (the "impurified fraction") is at least twice as high as in the other fraction (the "clean fraction").

Thus, according to the invention, there is a "clean fraction" and an "impurified fraction."

In the context of the present invention, the term "fraction" is to be understood as a division of SiC powders, produced by physical separation, according to their impurities.

The physical separation can be carried out according to various physical properties, such as particle size, density, mass, or concentration.

For example, after the physical separation of the powdery SiC waste products according to particle sizes, powder groups having, for example, three, four, or five different particle sizes can be obtained. Depending on the subdivision and composition of the impurities in the powder groups, these are then assigned to the two fractions, i.e. the clean and the impurified fraction. It is readily possible for the applicable person skilled in the art to carry out the separation of the respective powder groups with regard to the impurities into the two fractions according to the invention with only a few fractionation attempts and content analyses, so that a separation into a "clean" and an "impurified" fraction is achieved with the parameters according to the invention.

Advantageously, the mass of impurities in one fraction, the "impure" fraction, is ten times higher, more advantageously 20 times higher, than in the other "clean" fraction.

Advantageously, based on the total mass of the two fractions, the "clean" fraction has a mass percentage of ≥60% by mass, advantageously ≥70% by mass, and more advantageously ≥80% by mass.

Furthermore, within the scope of the present invention, the mass of impurities in a fraction should be understood to mean the mass concentration of all of the components that are not SiC.

The primary quality feature of an SiC powder is the concentration of SiC, which is determined using FEPA Standard 45-1:2011. The remainder up to 100% is assumed to be impurity content.

The doping elements built into the SiC lattice, such as Al and Bor, are not regarded as impurities in the context of the present invention. These impurities are not detrimental or disruptive to most SiC applications.

According to the invention, the SiC concentration in the "clean" fraction is increased by comparison to the starting SiC powder due to the separation of the impurities. An increase in the SiC concentration from 85% in the starting powder to 95% in the "clean" fraction or from a concentration of 96% in the starting powder to a concentration of at least 99% SiC in the "clean" fraction is advantageously achieved. The mass of impurities in the starting material is at least 3 to 100 times higher than the mass of impurities in the "clean" fraction.

With the method according to the invention for separating impurities from silicon carbide, powdery SiC waste products having at least 50% by mass SiC and an average particle size $d_{50}$ between 0.5 and 1000 μm, measured by laser diffraction, and a minimum content of 0.1% by mass iron and 0.1% by mass metallic silicon are used as the starting materials.

Here, it is advantageous when the powdery SiC waste products have at least 75% by mass SiC, better 80% by mass SiC, even better 85% by mass SiC, or 90% by mass SiC. In the case of powdery SiC waste products, the proportion of SiC is usually not as high, however, it is possible to perform known preparation and homogenization methods before the use of the powdery SiC waste products in order to already remove the impurities that are separable with these methods. Thus, the mass of starting materials for the method according to the invention can be reduced overall and limited to the powdery SiC waste products, whose impurities are thus not separable.

Furthermore, it can be advantageous according to the invention that powdery SiC waste products having at least 50% by mass SiC and an average particle size $d_{50}$ between 0.5 and 500 μm or between >500 and 1000 μm, measured by laser diffraction, are used.

According the solution according to the invention, powdery SiC waste products are used that have at least 50% by mass SiC and an average particle size $d_{50}$ between 0.5 and 1000 μm, measured by laser diffraction, and a minimum content of 0.1% by mass iron and 0.1% by mass metallic silicon, which advantageously have a content of 0.5 to 5.0% by mass iron and 0.5 to 5.0% by mass metallic silicon. According to the invention, the SiC waste products must have a content of 0.1% by mass iron, which can be present in the form of iron, iron alloys, or iron compounds. The at least 0.1% by mass metallic silicon which is present according to the invention can be present in the form of free silicon. If the SiC waste products which are to be used according to the invention do not originally have these contents of at least 0.1% by mass iron and 0.1% by mass metallic silicon, these contents must be realized by the addition of iron, iron alloys, iron compounds, and/or metallic silicon.

Accordingly, it is advantageous when the SiC waste products are analyzed for their material composition before their use in the method according to the invention, so that during the subsequent temperature treatment, silicon, $SiO_2$, iron, iron-containing compounds, and/or carbon can be added in order to powdery SiC that is as completely recycled as possible as the end product of the temperature treatment. Soot and/or coke powder can advantageously be added as the carbon. The $SiO_2$ can also be present through an oxidation of the SiC.

It is particularly advantageous when the amount of free carbon, $SiO_2$, free silicon, and iron is adjusted before the temperature treatment such that the free carbon can stoichiometrically react with the $SiO_2$ and the free silicon during the temperature treatment in order to form SiC, wherein the amount of free silicon is adjusted excessively with respect to this reaction such that the free silicon and iron are contained in a mass ratio of 60:40 to 20:80. Thus, during the temperature treatment, chemical compounds, in particular iron silicide, can form, which have a high linear thermal expansion coefficient of $>6 \times 10^{-6}$ 1/K in the temperature range between 20 and 1400° C., which is decisive for the subsequent purification.

It is also particularly advantageous when the free silicon and iron is contained in mass ratio of 35:65 to 20:80. Here, during the temperature treatment, it is primarily the metastable iron silicide $Fe_5Si_3$ that forms, which leads to a very good purification capability during the subsequent preparation due to its very high expansion coefficient.

Powdery SiC waste products as a starting material for the production of recycled powdered silicon carbide can be used as powder in a loose bed. Powders having a low compaction, as is the case due to production technology and/or the storage of the powders, can also be used as the starting materials.

It is advantageous when the SiC waste products are not used in a loose bed, but rather subject to slight compression forces before use in the method according to the invention. It is particularly advantageous when compression forces between 0.002 and 100 MPa are applied in order to compress the powder.

The density of the bed is determined by weighing and finding the volume of the bed. The true density of the powder is determined, for example, by gas pycnometry. If the composition is known, it can also be calculated from the known true density of the components. The true density of silicon carbide is 3.21 $g/cm^3$.

These powdery SiC waste products for the production of recycled powdered silicon carbide are then subjected to a temperature treatment under a vacuum or non-oxidizing atmosphere at temperatures of 1400-2600° C.

The temperatures are advantageously between 2000° C. and 2600° C.

During the temperature treatment of the powdery SiC waste products, low heating rates of less than or equal to 8 K/min are advantageously used when heating in the temperature range between 1200° C. to <1400° C. and from 1400° C. to 1800° C., advantageously heating rates of less than or equal to 5 K/min for temperatures above 1800° C.

In the context of the present invention, the heating rate is understood to be the temperature difference at the start and end of the temperature range, divided by the total time of the heating in this temperature range.

However, in the respective temperature range, various heating rates and also various dwell times can be adjusted.

In the context of the present invention, dwell time is understood to be a heating rate of 0 K/min during this time.

The dwell times at the temperatures of the method according to the invention are advantageously between 10 minutes and 300 minutes, wherein this also depends on the powder volume to be treated and on the temperature.

It is also true that the lower the maximum temperature is realized, the longer the dwell time at the respective maximum temperature.

Temperatures in the range between 1400 and 2000° C. are also advantageously suitable for powdery SiC waste products having at least 50% by mass SiC and an average grain size $d_{50}$ between 500 and 1000 μm, measured by laser diffraction.

During the temperature treatment under a non-oxidizing atmosphere, a throughput of flowing, non-oxidizing gas with an average flow rate of 0.5 to 30 l/min is set for the heating. It is particularly advantageous when a throughput of the flowing, non-oxidizing gas with an average flow rate of 0.5 to 30 l/min is the set in the temperature range between 1200 and 2000° C.

In the context of the present invention, the average flow rate is understood to be the entire throughput gas amount in the aforementioned temperature range from the start to the end of the temperature range, divided by the total time of the heating in this temperature range.

In the respective temperature range, different flow rates of the flowing, non-oxidizing gas can be set. The flowing gas atmosphere can be set in an over-pressure or under-pressure, wherein an under-pressure for example between 70,000 and 90,000 Pa is preferred.

Depending upon the apparatus for the temperature treatment according to the invention of the powdery SiC waste products, the method can be performed differently.

Typically, the temperature treatment is performed in a closed furnace body, into which the powdery SiC waste products are introduced and present in fireproof vessels (crucibles).

Either a vacuum is produced in such a closed furnace body, or a non-oxidizing gas atmosphere is produced. In the case of a non-oxidizing gas atmosphere, the gas is advantageously guided through the furnace body in such a way that it flows around the vessels and the powder as completely as possible. For example, this can be achieved in that the gas flows in on one side of the furnace body and flows out on the opposite side, wherein the vessels are disposed between the inlet and the outlet. This gas guidance or a vacuum is possible in both a so-called batch furnace for a discontinuous temperature treatment as well as in running furnaces for a continuous temperature treatment.

Technical inert gas atmospheres, such as argon or nitrogen atmospheres, which have a residual oxygen content of <100 ppm, are used as the non-oxidizing atmosphere. However, mixtures with CO can also be used, for example, because these do not lead to the oxidation of the SiC. The temperature treatment is possible under a slight overpressure as well as under negative pressure, up to a vacuum. The temperature treatment is advantageously carried out under an argon atmosphere. The temperature treatment is possible both in batch furnaces as well as in continuous operation.

The temperature treatment of the SiC waste products under a vacuum or non-oxidizing atmosphere can be performed while dissipating gaseous reaction products.

Advantageously, carbon monoxide (CO) and silicon monoxide (SiO) are dissipated. Advantageously, the dissipation of gaseous reaction products occurs during the heating phase and preferably in the temperature range between 1200° C. in 2000° C., particularly preferably in the temperature range between 1350° C. and 1800° C.

With the method according to the invention, a separation of impurities from recycled, powdered silicon carbide is achieved.

During the temperature treatment of the SiC waste products for the production of recycled, powdered silicon carbide, the substantially powdered structure of the products is retained. The powder particles are either in the form of isolated primary crystals and crystallites, i.e. not connected to one another, or slightly intergrown as secondary crystallites, i.e. with a connection of a few primary crystals or crystallites that have intergrown.

Crystallites are understood to mean individual grains which are homogeneous in terms of their crystal structure and which, in their external form, do not have the crystal structure or have it only partially.

Following the temperature treatment, the recycled, powdered silicon carbide is cooled.

Cooling is advantageously carried out at a cooling rate of 0.1 to 100 K/min, particularly advantageously until a temperature of 200° C. is reached. In industrial processes, the furnace can typically be opened from this temperature of 200° C., and the powder can be further cool in the air.

In the case of a temperature treatment between 2000 and an end temperature of 2600° C., a fast cooling from the respective end temperature to 1800° C. at a cooling rate of 10 to 50 K/min is particularly advantageous. Likewise, the cooling advantageously occurs in a temperature range between 1200° C. and 800° C. at a cooling rate of 5 to 25 K/min. Such cooling rates can technically be achieved by the use of fast cooling devices in that, for example, cold non-oxidizing gas is introduced into the furnace, circulated, and guided over a heat exchanger.

The subsequent mechanical treatment according to the invention is advantageously carried out by applying a mechanical impulse, advantageously by mixing or grinding or by using eddy currents and/or ultrasound.

The grinding can in turn advantageously be carried out by means of autogenous grinding under a reduced pressure (inter-particular movements).

Furthermore advantageously, the mechanical treatment is carried out with an energy input of between 0.1 and 5 MJ/kg.

The mechanically treated SiC powder is then physically separated.

The recycled powdery SiC can be separated according to the particle size, the particle shape, the density, and/or the physical and/or chemical surface properties of the particles.

A separation according to particle size and/or particle shape can advantageously be carried out by sieving, sifting and/or cyclone methods.

A separation can be carried out through the effect of mass forces with regard to the particle density by means of flotation, sedimentation, sifting, centrifugation, and/or cyclone methods or separation according to the density of the particles by flotation and/or cyclone methods.

Surface properties can be used in separation methods that separate by means of electric field strengths or the like. Solid body properties can be used in separating methods that use electrical material properties, e.g. magnetizability.

After the physical separation, the SiC powder obtained is divided into two fractions, wherein the division is based on the mass of impurities and, according to the invention, the mass of impurities in one fraction is at least twice as high as in the other fraction.

The division into two fractions according to the invention has surprisingly shown that the one fraction contains SiC powder with impurities of less than 5% by mass, advantageously less than 2% by mass, more advantageously less than 1% by mass, and the other fraction contains substantially all of the remaining impurities.

The division into at least one "clean" fraction and at least one fraction with a higher impurity content is carried out using one or more classic mechanical separation methods, advantageously a dry classification method, such as sieving or sifting. Depending on the number of separating cuts in the method, a plurality of purified, clean, and impurified fractions can also be produced, which, however, are recombined at the end of the division/fractionation to form the two fractions according to the invention.

The purification factor can be determined in each fraction by dividing/fractionating into a plurality of fractions before combining, and the difference in the purification factors of the two fractions according to the invention can be adjusted by combining the fractions at the end of the method according to the invention.

With the method according to the invention, at least 95% by mass, advantageously at least 98% by mass, more advantageously 99% by mass silicon carbide is achieved in at least one fraction.

Surprisingly, it has been found that the metallic impurities melt during the temperature treatment and at least partially wet the SiC grains, so that after cooling, the metallic impurities form a permanent bond with the SiC grains between the neighboring SiC grains and in the interstices of a plurality of SiC grains. The metallic impurities are thus present as metal silicides or ternary metal-Si—C compounds or alloys or as mixtures thereof, so-called metallic mixed phases.

Surprisingly, the mechanical treatment causes the metallic impurities to flake off or break off, whereby these impurities are separated from the SiC and are made even smaller during the further mechanical treatment.

As a result, an enrichment of these metallic impurities in a fraction of the mechanically treated, recycled, powdered silicon carbide is achieved.

If the SiC waste products as a starting material for the production of purified silicon carbide powder do not contain any carbon, it is then advantageous to add carbon particles, for example in the form of soot, graphite, or coke powder.

Such an addition can advantageously be 0.3 to 0.5 times the proportion-by-weight of carbon, based on the free Si content and/or the Si content of the $SiO_2$.

With the method according to the invention, purified SiC powders are to be produced which can be reused industrially, in particular for high-tech applications, and which can be produced with a high yield in a simple and economical method.

The SiC powder purified using the method according to the invention can then be subjected to a chemical purification.

The recycled, powdered silicon carbide is separated according to the invention into two fractions, wherein the recycled silicon carbide powder in one fraction has at most 5% by mass impurities, advantageously at most 2% by mass, more advantageously less than 1% by mass, and the remaining impurities are contained in the other fractions.

The advantage of the method according to the invention is that the mechanical treatment and the fractionation of the powder can be implemented using conventional methods which are known and already in use for a preparation of SiC powders, for example for use as abrasives.

The purified silicon carbide powder according to the invention with at least 98% by mass SiC, advantageously 99% by mass SiC, and maximum 2% by mass impurities has residues of the melted impurities still adhered to the surface of the purified silicon carbide powder.

Surprisingly, only a maximum of 2% by mass impurities remain on the surface of the SiC powder particles after the method according to the invention.

After the temperature treatment according to the invention, SiC particles are formed, which surprisingly have unique structures for a material separation in the mechanical treatment according to the invention. These structures are characterized in that the metallic impurities can be present in the form of metallic mixed phases, which are concentrated and deposited on the surfaces of the silicon carbide powder particles and are usually so permanently bonded to the surface of the SiC powder particles that a mechanical separation of the SiC powder particles from the largest part of the impurities and in particular the metallic impurities in two or more fractions is easily realizable. Such an accumulation of the impurities on the surface of the SiC powder articles has not been observed thus far. It is likewise surprising that these structures of the impurities accumulated on the surface of the SiC powder particles can be removed to a very large extent by a comparatively simple mechanical separation and/or physical treatment, so that highly to extremely pure SiC powder having at least 98% by mass SiC can be produced in one fraction.

The impurities are substantially present in the form of mostly drop-like melts of the metallic mixed phases, which are deposited in an island-like manner on the surface of the silicon carbide powder particles. After the mechanical treatment and physical separation according to the invention, the remaining impurities are permanently bonded to the surface of the SiC powder particles.

According to the invention, these impurities are advantageously disposed on the surface of the individual silicon carbide powder particles after the temperature treatment substantially on the planarly and/or convexly shaped parts of the surface of silicon carbide powder particles. The wetting angle of these impurities on the surface of the silicon carbide powder particles varies significantly, but is typically between 10° and 90°.

Furthermore, the impurities can also be disposed as metallic mixed phases between SiC powder particles, which on the one hand are permanently bonded to the planar and/or convex shape of the surface of the individual SiC powder particles, and on the other hand are also bonded to one another as metallic mixed phases and thus fill interstices between the SiC powder particles. At these points and/or grain boundaries, the metallic mixed phases form shapes that are visually reminiscent of weld seams in fillet weld shapes (flat weld, hollow weld, arched weld).

The metallic mixed phases formed as impurities during the temperature treatment of the method according to the invention are characterized in that they are primarily silicides or carbides of the present metals. Above all, the method is aimed at producing the iron silicides $Fe_3Si$ ($\alpha_2$ phase), $FeSi$ ($\epsilon$ phase), $FeSi_2$ ($\zeta_2$ phase or $Fe_3Si_7$) and in particular the metastable $Fe_5Si_3$ ($\eta$ phase). These silicides typically have a linear thermal expansion coefficient of $>6\times10^{-6}$ 1/K in the range of 20-1400° C. This forms the basis for the separation method according to the invention, as they can be separated relatively easily from the surfaces of the silicon carbide powder particles.

In addition to the aforementioned silicides, ternary Fe—Si—C compounds can also occur to a lesser extent. Other metallic impurities such as Ti, V, Al can also be dissolved in the silicides and carbides or form mixed crystals.

Surprisingly, as a result of the mechanical treatment of the temperature-treated SiC waste products, the impurities both on the surfaces of the SiC powder particles and between the SiC powder particles break off relatively cleanly from the SiC powder particles, so that substantially only the droplet-like melts of the metallic mixed phases deposited in an island-like manner remain as impurities on the planarly and/or convexly shaped surface of the silicon carbide powder particles. If the island-like melts also break off completely or partially, permanently adhering fragments of these melts remain on the planar and/or convex surfaces of the silicon carbide powder particles. The break points of the permanently adhering fragments have a typical shell-like break (conchoidal break).

The SiC powders temperature-treated according to the invention contain SiC powder particles and substantially metallic impurities, wherein these SiC powders have a significantly higher proportion of intergrown secondary crystallites connected by the metallic impurities before the mechanical treatment according to the invention than after the mechanical treatment. During the mechanical treatment, these intergrown secondary crystallites are isolated in order to form primary crystallites, and a majority of the adhering metallic impurity is blown off.

After the method according to the invention, the impurities deposited in an island-like on the surface of the silicon carbide powder particles, which are permanently bonded to the SiC powder particles, have a wetting angle of these metallic mixed phases on the planar and/or convex SiC powder particle surfaces between 10 and 90°.

In the context of the invention, the wetting angle of the metallic mixed phases on the SiC particle surfaces means the angle that occurs at the phase boundary between the solid surface of a SiC particle, the molten metallic mixed phase, and the surrounding gas atmosphere during the temperature treatment as a result of the interfacial tensions (Young's Equation) and is retained even after the melt has solidified. Even when the metallic mixed phases are arranged as seams between SiC particles and in the form of interstices, the wetting angle is present at the phase boundary between the SiC particle surface, the metallic mixed phase, and the surrounding atmosphere.

The wetting angle is preferably measured using microscopic images, particularly preferably by means of image evaluation of images taken by way of raster electron microscope of ceramographically/metallographically prepared bevels of the temperature-treated powder particles, which produce a cross-section through the phase boundaries.

The wetting angle of remaining, permanently adhering impurities in the form of metallic mixed phases and their fragments on the SiC particle surfaces can also be measured on the mechanically treated, cleaned SiC powders according to the invention.

The break pattern can be used to easily distinguish between the surfaces of the mixed metal phases and mixed phase fragments on the cleaned SiC powders that were broken during the mechanical treatment and the surfaces of the mixed metal phases on the temperature-treated SiC powders that were caused by the melting during the temperature treatment.

In the case of the mechanically treated, cleaned SiC powder, only the wetting angles at the phase boundary between the molten mixed phase, the surface of the SiC particles, and the surrounding atmosphere are used in order to determine the wetting angle, but not the angles between the break surfaces of the metallic mixed phase fragments created by the mechanical treatment and the SiC particle and the surrounding surface.

These cleaned silicon carbide powders are thus distinguished from known recycled SiC powders, in which the impurities are predominantly present separately from the SiC particles.

The purified silicon carbide powder according to the invention can therefore be distinguished from known recycled powders by light and electron microscopic methods such as REM, TEM, or REM-EDX.

Likewise, after the mechanical processing according to the invention, in particular the reduction, of the SiC particles after the temperature treatment, characteristic break points and break surfaces have formed on the SiC powder particles treated according to the invention, which can be easily determined using the examination methods mentioned. These typical break points and surfaces of the impurities that have arisen according to the invention are a characteristic feature of the purified silicon carbide powder according to the invention.

The silicon carbide powder particles that are present according to the method according to the invention are mostly broken at the grain boundaries of the individual SiC particles and thus also ensure an isolation of the particles.

A particular advantage of the solution according to the invention is that the removal of the melted impurities and a clear fractionation can be better achieved with a successively larger amount of impurities in the SiC waste products.

The invention will now be explained in further detail by way of several exemplary embodiments.

EXAMPLE 1

10 kg of an SiC powder as a by-product from SiC primary crushing, containing 91.8% by mass SiC, 1.3% by mass $C_{free}$, 1.8% by mass Si, 3.7% by mass $SiO_2$, 0.4% by mass Fe, and impurities with Al, V, Ti, and Ca in the range of >300 ppm each, is mixed with 180 g of coke powder, 100 g Si, and 40 g Fe. The powder mixture has an average particle size of 9.5 μm, determined by means of laser diffraction. The bed density of the powder mixture is 0.6 g/cm3. The powder mixture is loosely filled in graphite crucibles and compressed at 50 MPa in a plunger. The crucibles are heated in an inert gas furnace under an argon atmosphere at 8 K/min up to 2500° C. and held there at 2500° C. for 60 minutes, wherein a reduced heating rate of 3 K/min is used between 1200° C. and 2000° C. During the entire temperature treatment, an Ar gas flow is guided around the graphite crucible at 20 l/h.

Furthermore, carbon monoxide (CO) and silicon monoxide produced from the inert gas furnace is dissipated.

The cooling is performed at an overall speed of 2.5 K/min.

After cooling, the powdered crucible contents are treated in an air mill at 0.1 MJ/kg and, after a sifting step, split into three powders with particle sizes of <10, 10-60 μm, >60 μm.

Before the mechanical treatment, the SiC powder has an SiC content of 97.8% by mass. In particular, the metallic impurities are present in the same concentration order of magnitude as the starting powder.

After the mechanical treatment in the air mill, the powder with a particle size >60 μm has an SiC content of 99.1% by mass SiC. The content of Si and $SiO_2$ is 0.22% by mass respectively, that of $C_{free}$ is 0.12% by mass, the Fe content is 0.16% by mass, and the other contents of metallic impurities each amount to significantly <100 ppm.

In the other two powders that were combined, 8.6 times the amount of impurities has been found.

The average grain size after the temperature treatment and the mechanical purification in the "clean" fraction is 92.7 μm. Thus, the grains are on average 9.75 times larger than in the starting material placed in the inert gas furnaces.

As a result of the method according to the invention, the "clean" fraction has a mass percentage of 81% by mass.

Before the mechanical treatment, the temperature-treated powder had a large number of secondary particles in whose interstices the impurities had accumulated. After the mechanical treatment, the "clean" fraction contains almost exclusively primary particles. Island-shaped or fragmented island-shaped metallic melts of primarily $Fe_5Si_3$ can be found on these particles on the convexly shaped parts of the particle surfaces and in the places where, due to the mechanical forces introduced, the secondary particles have been converted back into primary particles. The remaining secondary particles have impurities in the interstices of the intergrown particle agglomerates.

The existence of these impurities, which are permanently bonded to the SiC particles, has been proven by means of REM.

In the "impurified" fraction, the impurities are also present in powder form, in addition to the forms described here.

EXAMPLE 2

10 kg of an SiC powder as a by-product from SiC processing, containing 95.8% by mass SiC, 0.2% by mass $C_{free}$, 1.2% by mass Si, 1.2% by mass $SiO_2$, 1.4% by mass Fe, and impurities with Al, V, Ti, and Ca in the range of >100 ppm each, is mixed with 80 g of coke powder. The powder mixture has an average particle size of 41.5 μm, determined by means of laser diffraction. After the compression step, the powder mixture introduced into the crucibles has a density of 1.3 g/cm$^3$. The crucibles are heated in an inert gas furnace under an argon atmosphere at 70000 Pa under-pressure at 5 K/min up to 2000° C. and at 6 K/min up to 2300° C. and held at this temperature for 180 minutes. During the entire temperature treatment, an Ar gas flow is guided around the graphite crucible at 5 l/h.

Furthermore, carbon monoxide (CO) and silicon monoxide produced from the inert gas furnace is dissipated in the temperature range between 1200° C. and 2000° C.

The cooling is performed at an overall speed of 2.5 K/min. In the range between 1200° C. and 800° C., the cooling occurs at a rate of 8 K/min.

After cooling and before the mechanical treatment, the SiC powder has an SiC content of 96.1% by mass. The metallic impurities are present unchanged.

The powdered crucible contents are treated in a mill at 0.3 MJ/kg and, after sifting, split into five powders with particle sizes of <40 μm, 40-63 μm, 63-125 μm, >250 μm.

Subsequently the powders with particle sizes of <40 and 40-63 μm are mixed into one fraction, and the powders with particle sizes of 63-125 μm, 125-250 μm, and >250 μm are mixed into the second fraction. The "clean" fraction is the fraction with the particle sizes of 63-125 μm, 125-250 μm, and >250 μm, which has a SiC content of 98.8% SiC. The content of Si and $SiO_2$ is 0.2% by mass respectively, that of $C_{free}$ is 0.14% by mass, the Fe content is 0.25% by mass, and the other contents of metallic impurities were each significantly reduced to <50 ppm.

In the "impurified" fractions with the particle sizes of <40 and 40-63 μm, there are 13.8 times more impurities compared to the "clean" fraction.

The average grain size after the temperature treatment and the mechanical purification in the "clean" fraction is 100.4 μm. Thus, the particles are on average 2.4 times larger than in the starting material placed in the inert gas furnaces.

As a result of the method according to the invention, the "clean" fraction has a mass percentage of 82.5% by mass.

Before the mechanical treatment, the temperature-treated powder had a large number of secondary particles in whose interstices the impurities had accumulated. After the mechanical treatment, the "clean" fraction contains almost exclusively primary particles. Fragments of metallic melts of $Fe_3Si$ and $Fe_5Si_3$ can be found on these particles on the planarly and convexly shaped parts of the particle surfaces and in the places where, due to the mechanical forces introduced, the secondary particles have been converted back into primary particles. The remaining secondary particles have impurities with the same silicides in the interstices of the intergrown particle agglomerates.

The existence of these impurities, which are permanently bonded to the SiC particles, has been proven by means of REM-EDX.

In the "impurified" fraction, the impurities are also present in powder form, in addition to the forms described here.

EXAMPLE 3

10 kg of a dusty SiC powder as a by-product from SiC processing, containing 98.5% by mass SiC, 0.3% by mass $C_{free}$, 0.6% by mass Si, 0.4% by mass $SiO_2$, 0.1% by mass Fe, and impurities with Al, V, Ti, and Ca in the range of >100 ppm each. This powder is mixed with 20 g of Fe. The powder mixture has an average particle size of 16.4 µm, determined by means of laser diffraction. The powder bed is placed into a crucible and compressed to a density of >1.2 $g/cm^3$. The crucible is heated in a furnace under a nitrogen atmosphere at 10 l/min nitrogen throughput and an under-pressure of 0.9 bar, at 5 K/min up to 1800° C. and from there to 2400° C. at 3 K/min. At 2400° C., it is held for 100 minutes.

The cooling is performed at a speed of 10 K/min.

After cooling, the powdered crucible contents are treated in an air mill at 1 MJ/kg and subsequently split into three powders by means of sedimentation with densities of 2.5-3.9 $g/cm^3$.

Before the mechanical treatment, the SiC powder has an SiC content of 99.5% by mass. In particular, the metallic impurities are present in the same concentration order of magnitude as the starting powder.

After the mechanical treatment in a mill, the powder with a density of 3.2 $g/cm^3$ has 99.8% by mass SiC and thus forms the "clean" fraction. The content of Si is 0.03% and the content of $SiO_2$ is 0.02% mass, that of $C_{free}$ is 0.11% by mass, the Fe content is 0.02% by mass, and the other contents of metallic impurities were all significantly reduced to <20 ppm.

The powders with the densities of 2.5 $g/cm^3$ and 3.9 $g/cm^3$ were combined and form the "impurified" fraction. In this fraction, there are 10.4 times more impurities compared to the "clean" fraction.

The average particle size after the temperature treatment and the mechanical purification in the "clean" fraction is 59.7 µm. Thus, the grains are on average 3.6 times larger than in the starting material placed in the inert gas furnaces.

As a result of the method according to the invention, the "clean" fraction has a mass percentage of 84% by mass.

Before the mechanical treatment, the temperature-treated powder had a large number of secondary particles in whose interstices the impurities had accumulated. After the mechanical treatment, the "clean" fraction contains almost exclusively primary particles. Island-shaped metallic melts of $Fe_5Si_3$ can be found on these particles on the convexly shaped parts of the particle surfaces and in the places where, due to the mechanical forces introduced, the secondary particles have been converted back into primary particles. The remaining secondary particles have impurities in the interstices of the intergrown particle agglomerates.

The existence of these impurities, which are permanently bonded to the SiC particles, has been proven by means of REM. The metallic impurities have wetting angles to the SiC particle surfaces between 30 and 75°, proven by analytical image evaluations of bevels of the powder particles.

In the "impurified" fraction, the impurities are also present in powder form, in addition to the forms described here.

EXAMPLE 4

10 kg of a dusty SiC powder as a by-product from SiC processing, containing 97.5% by mass SiC, 0.4% by mass $C_{free}$, 0.6% by mass Si, 0.5% by mass $SiO_2$, 0.2% by mass Fe, and impurities with Al, V, Ti, and Ca in the range of >100 ppm each, is mixed with 180 g of iron powder and 60 g of Si powder. The powder mixture has an average particle size of 16.4 µm, determined by means of laser diffraction. The bed density of the powder mixture is 1 g/cm3. The powder mixture is loosely filled in graphite crucibles. The crucibles are heated in a furnace under a vacuum at 7.5 K/min up to 2050° C. and held there at 2050° C. for 270 minutes.

The cooling is performed at a speed of 10 K/min.

After cooling, the powdered crucible contents are treated in a mill at 0.2 MJ/kg and, on the basis of different surface potentials in the electric field, split into two fractions.

Before the mechanical treatment, the SiC powder has an SiC content of 98.3% by mass. In particular, the metallic impurities are present in the same concentration order of magnitude as the starting powder.

After the mechanical treatment in the mill, the "clean" fraction has 99.2% by mass SiC. The content of Si and $SiO_2$ is 0.3% and 0.2% by mass respectively, that of $C_{free}$ is 0.2% by mass, the Fe content in the clean fraction is 0.1% by mass, and the other contents of metallic impurities were all significant reduced to <100 ppm.

In the "impurified" fractions, there is 9.6 times the amount of impurities compared to the "clean" fraction.

The average grain size after the temperature treatment and the mechanical purification in the "clean" fraction is 33 µm. Thus, the grains are on average twice as large as the starting material placed in the inert gas furnaces.

As a result of the method according to the invention, the "clean" fraction has a mass percentage of 87% by mass.

Before the mechanical treatment, the temperature-treated powder had a large number of secondary particles in whose interstices the impurities had accumulated. After the mechanical treatment, the "clean" fraction contains almost exclusively primary particles. Island-shaped metallic melts of $Fe_5Si_3$, FeSi, and $FeSi_2$ can be found on these particles on the convexly shaped parts of the particle surfaces and in the places where, due to the mechanical forces introduced, the secondary particles have been converted back into primary particles. The remaining secondary particles have impurities in the interstices of the intergrown particle agglomerates.

The existence of these impurities, which are permanently bonded to the SiC particles, has been proven by means of TEM.

In the "impurified" fraction, the impurities are also present in powder form, in addition to the forms described here.

EXAMPLE 5

10 kg of a powdery SiC powder as a by-product from the SiC raw material production, containing 92.6% by mass SiC, 2.75% by mass $C_{free}$, 0.1% by mass Si, 3.5% by mass $SiO_2$, 0.2% by mass Fe, and impurities with Al, V, Ti, and Ca in the range of >400 ppm is mixed with 150 g of sand and 25 g of graphite powder. The powder mixture has an average particle size of 100 m, determined by means of laser diffraction. The powder mixture is loosely filled in graphite crucibles and subsequently compressed to >1 $g/cm^3$. The crucibles are heated in an inert gas furnace under an atmosphere at 5 K/min up to 1900° C., and the pressure is set to 70000 Pa under-pressure. At 1900° C., the temperature is held for 180 minutes.

The cooling is performed at a speed of 25 K/min.

After cooling, the powdered crucible contents are treated in a mill at 0.1 MJ/kg and, by means of a cyclone series connection, split into three powders with particle sizes of <20 μm, 20-70 μm, >70 μm.

Before the mechanical treatment, the SiC powder has an SiC content of 98.3% by mass. In particular, the metallic impurities are present in the same concentration order of magnitude as the starting powder.

After the mechanical treatment in the mill, the powder with the particle size of >70 μm, as the "clean fraction," has a SiC content of 98.5% by mass. The content of Si and SiO$_2$ is 0.1% and 0.1% by mass respectively, that of C$_{free}$, is 1% by mass, the Fe content is 0.1% by mass, and the other contents of metallic impurities were each significantly reduced to <200 ppm.

The powders with the particle sizes <20 μm and 20-70 μm were combined into the "unpurified" fraction.

In the "impurified" fractions, there are 2.3 times more impurities compared to the "clean" fraction.

The average grain size after the temperature treatment and the mechanical purification in the "clean" fraction is 125 μm. Thus, the particles are on average 1.25 times larger than in the starting material placed in the inert gas furnaces.

As a result of the method according to the invention, the "clean" fraction has a mass percentage of 90% by mass.

Before the mechanical treatment, the temperature-treated powder had a large number of secondary particles in whose interstices the impurities had accumulated. After the mechanical treatment, the "clean" fraction contains almost exclusively primary particles. Island-like metallic melts of carbides and silicides of the silicon and vanadium can be found on these particles on the convexly shaped parts of the particle surfaces and in the places where, due to the mechanical forces introduced, the secondary particles have been converted back into primary particles. The remaining secondary particles have impurities in the interstices of the intergrown particle agglomerates.

The existence of these impurities, which are permanently bonded to the SiC particles, has been proven by means of REM-EDX.

In the "impurified" fraction, the impurities are also present in powder form, in addition to the forms described here.

The invention claimed is:

1. A method for separating impurities from silicon carbide, in which powdery SiC waste products having at least 50% by mass SiC and an average particle size d$_{50}$ between 0.5 and 1000 μm, measured by laser diffraction, and a minimum content of 0.1% by mass iron and 0.1% by mass metallic silicon are subjected to a temperature treatment under a vacuum or in a non-oxidizing atmosphere at temperatures of 1400-2600° C. and cooled, and are then mechanically treated and physically separated, and subsequently a division of the physically separated SiC powder into two fractions is performed, of which a mass of impurities in one fraction is at least twice as high as in the other fraction.

2. The method according to claim 1, in which the mass of impurities in one fraction is at least 10 times higher, than in the other fraction.

3. The method according to claim 1, in which the powdery SiC waste products have at least 75% by mass SiC.

4. The method according to claim 1, in which the powdery SiC waste products having at least 50% by mass SiC and having the average particle size d$_{50}$ between 0.5 and 500 μm, measured by laser diffraction, are used.

5. The method according to claim 1, in which the powdery SiC waste products having at least 50% by mass SiC and having the average particle size d$_{50}$ between >500 and 1000 μm, measured by laser diffraction, are used.

6. The method according to claim 1, in which the powdery SiC waste products having at least 50% by mass SiC and having the average particle size d$_{50}$ between >500 and 1000 μm, measured by laser diffraction, are subjected to a temperature treatment at temperatures of 1400 to <2000° C.

7. The method according to claim 1, in which the powdery SiC waste products having at least 50% by mass SiC and having the average particle size d$_{50}$ between 0.5 and 1000 μm, measured by laser diffraction, and a content of 0.5 to 5.0% by mass iron and 0.5 to 5.0% by mass metallic silicon are used.

8. The method according to claim 1, in which the temperature treatment of the SiC waste products is carried out at temperatures of 1400-2000° C.

9. The method according to claim 1, in which the temperature treatment of the SiC waste products is carried out at temperatures of 2000-2600° C.

10. The method according to claim 1, in which the temperature treatment is performed under a vacuum or a non-oxidizing atmosphere during the heating phase in the temperature range between 1200° C. and <1400° C. and from 1400° C. to 1800° C. with heating rates of less than or equal to 8 K/min.

11. The method according to claim 1, in which the temperature treatment is performed under a vacuum or a non-oxidizing atmosphere during the heating phase over 1800° C. with heating rates of less than or equal to 5 K/min.

12. The method according to claim 1, in which the temperature treatment performed under a vacuum or a non-oxidizing atmosphere includes holding times at a maximum temperature of 10 min to 300 min.

13. The method according to claim 1, in which the temperature treatment is performed under a non-oxidizing atmosphere with an amount of non-oxidizing gases of 0.5 to 30 l/h.

14. The method according to claim 1, in which the temperature treatment performed under a vacuum or a non-oxidizing atmosphere dissipates gaseous reaction products.

15. The method according to claim 1, in which the cooling of the powdery SiC is performed at a cooling rate of 0.1 to 100 K/min.

16. The method according to claim 1, in which the cooling of the powdery SiC is performed in a temperature range between 1200° C. and 800° C. at a cooling rate of 0.5 to 10 K/min.

17. The method according to claim 1, in which the mechanical treatment of the recycled powdery SiC is implemented by applying a mechanical impulse, by mixing, grinding, or by using eddy currents and/or ultrasound.

18. The method according to claim 17, in which the mechanical treatment is carried out with an energy input between 0.1 and 5 MJ/kg.

19. The method according to claim 1, in which the physical separation of the recycled powdery SiC is carried out according to the particle size, the particle shape, the density, and/or the physical and/or chemical surface properties.

20. The method according to claim 19, in which the separation according to the particle size and/or particle shape is carried out by sieving, sifting, and/or cyclone methods.

21. The method according to claim 19, in which the separation is carried out by the effect of mass forces with regard to the particle density by flotation, sedimentation, sifting, centrifugation, and/or cyclone methods, or when the separation is carried out according to the density of the particles through flotation and/or cyclone methods.

22. The method according to claim 19, in which the separation is realized in a fraction containing at least 95% by mass silicon carbide.

23. The method according to claim 1, in which substantially metallic impurities are separated as the impurities.

24. The method according to claim 1, in which, in order to remove impurities in the form of Si and/or C, carbon, soot, graphite, and/or coke powder, and/or silicon and/or silicon dioxide ($SiO_2$), is added during the temperature treatment.

\* \* \* \* \*